C. T. FRIEDRICH.
UNDERCHECK.
APPLICATION FILED DEC. 9, 1910.
997,386.
Patented July 11, 1911.
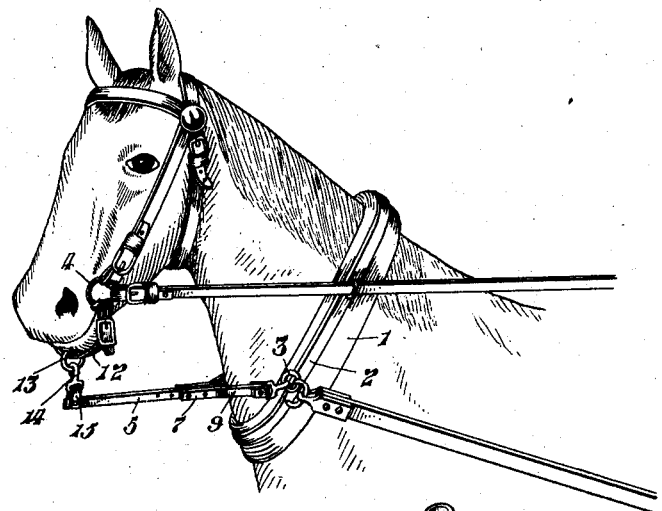
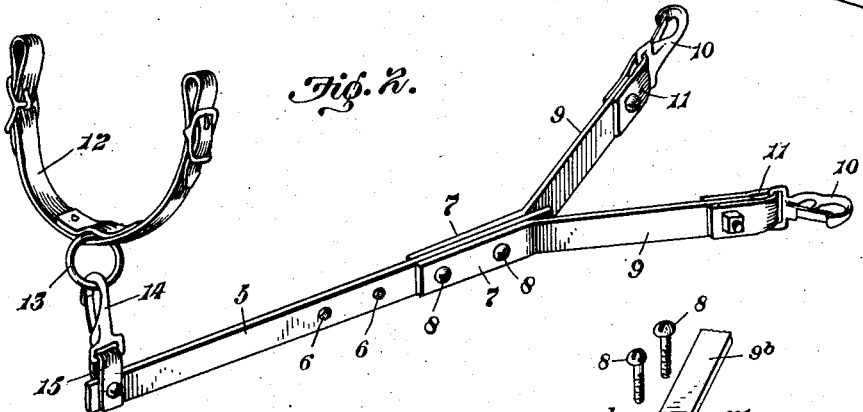
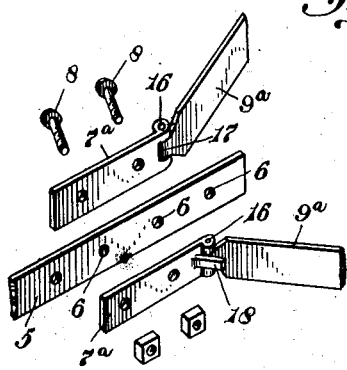
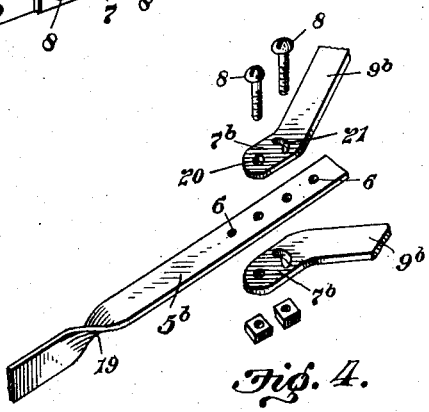
Inventor
Carl T. Friedrich.
Witnesses
J. H. Bishop.
Sylvia Boron.
By Bond & Miller
Attorneys

UNITED STATES PATENT OFFICE.

CARL TH. FRIEDRICH, OF NEAR ATKINSON, NEBRASKA.

UNDERCHECK.

997,386.   Specification of Letters Patent.   Patented July 11, 1911.

Application filed December 9, 1910. Serial No. 596,430.

*To all whom it may concern:*

Be it known that I, CARL TH. FRIEDRICH, a citizen of the United States, residing near Atkinson, in the county of Holt and State of Nebraska, have invented a new and useful Undercheck, of which the following is a specification.

My invention relates to improvements in devices for preventing horses from throwing their heads to the side to bite or annoy their team mates, to eat standing grain or corn while reaping or cultivating and to prevent horses from lowering their heads while driving, to take bits into their teeth; the objects of the improvement being to provide a simple, strong and effectual device of the character described which will be easily made, convenient in use, inexpensive and satisfactory in operation. These objects, together with other objects readily apparent to those skilled in the art, I attain by the construction illustrated in the accompanying drawings, although my invention may be embodied in other forms, the construction illustrated being chosen by way of example.

In the drawing, Figure 1 is a perspective view showing one of my invented jockey sticks in use upon a horse. Fig. 2 is a perspective view of a jockey stick embodying my invention, the same illustrating the preferred form of the device. Fig. 3 is a view of a modified form of jockey stick embodying my invention, parts of the same being broken away, and the parts illustrated being separated from each other to more fully disclose the construction. Fig. 4 is a second modification of the invention, the parts in said figure being also fragmentary and separated from each other for the purpose of clearer illustration.

Throughout the several views similar reference numerals indicate similar parts.

In Fig. 1 the numeral 1 indicates the collar of the horse upon which the hames 2 are arranged in the usual manner, said hames being provided with the rings 3 on both sides, as quite common in hame construction.

The numeral 4 indicates the bit rings of the bridle to which the reins and portions of the bridle are connected in the usual manner.

My invention consists essentially of a jockey stick provided with means for attachment to the harness of a horse on both sides of the neck and with means for attachment to the bit or bridle.

In the preferred form of construction such as shown in Figs. 1 and 2, the stem or leading member 5 is composed of a bar having considerable rigidity and provided at its rear portion with the equidistantly spaced apertures 6. A pair of rearwardly extending branch members are provided at their forward ends with stem attaching portions 7 adapted to be clamped together, one on each side of the stem member 5, by suitable bolts 8 extending through apertures in the said portions 7 and through certain of the apertures 6. The rearwardly extending harness attaching portions 9 formed integrally with the portions 7 extend obliquely outward from the said portions 7 so as to bring the extreme ends of the portions 9 on the two sides of the horse's neck and in convenient position for attachment to the rings 3 or their equivalents. In the drawings I have illustrated the attachment of the members 9 to the rings 3 as accomplished by means of snaps 10 connected to the ends of the portions 9 by means of flexible loops 11, preferably of leather.

At the forward end of the stem 5 appropriate flexible connection is made with the bit rings 4 or their equivalents. In the drawings I have shown this as accomplished by a chin strap 12 connected to the two bit rings and having a lower median ring 13 connected to said strap 12. Connection between the ring 13 and the forward end of the stem or leading member 5 is accomplished by a snap 14 engaging the ring 13 and connected to the stem 5 by means of a flexible loop 15, preferably of leather.

The purpose of providing the stem 5 with the plurality of apertures 6 is to make the device adjustable for horses of different lengths of neck. The bolts 8 being readily removable, the portions 7 may be clamped to the stem 5 in various adjustments as circumstances may require. In the form of device shown in Figs. 1 and 2 variation in the width of horses' necks may be accommodated by bending the portions 9 toward each other or away from each other as may be required.

In the operation of the device it will be noted that attachment being made on both sides of the neck lateral movement of the stem 5 at the front will be quite limited.

Said stem being connected to the bit or bridle on both sides of the mouth the horse's head will be maintained within reasonable limits of comfortable freedom in a straight forward position preventing movement of the head to the side for the purpose of biting or annoying another horse or to eat standing crops. It will also be noted that the head cannot be thrown downward and inward toward the chest in such way as to take the bit into the teeth as is a common fault of some horses. The maintenance of the head in proper position is accomplished not only by reason of the rigidity of the device in leading the horse by attachment to the bit or bridle, but also for the reason that as the horse throws his head to the side or downward he receives, by reason of such action a thrust upon the neck or shoulder as well as a sudden arrest of motion in the nature of a jerk imparted to the bit or bridle. In this manner the device herein disclosed accomplishes its purpose without injury to the horse and without the necessity of using the old form of jockey stick, wherein it was necessary to connect the stick to the horse's bit or bridle, the other end of the stick being connected to his team mate for the purpose of keeping the horses apart.

Another feature of my invented construction which should be noted is that by its use a horse inclined to throw his head about in an undersirable manner bears his own punishment as the device is connected only to himself and is thus an individual mechanical restraint well adapted to accomplish its purpose whether the horse be driven singly or in a team.

In Fig. 3 I have shown a modification wherein the portions 7ª of the branch members are not formed integrally with the portions 9ª, as in the preferred form of construction but are connected by a hinged joint at 16, thus permitting adjustment of the portions 9ª toward each other or from each other as the case may require. The portions 7ª are connected to the stem 5 by bolts 8, as in the preferred construction, and by drawing up said bolts tightly the knuckles 17 on the portions 9ª are caused to frictionally bear against the stem 5 in such manner as to hold the portions 9ª comparatively rigidly in the fixed adjustment desired. For the purpose of preventing the portions 9ª from turning outwardly away from each other beyond a certain predetermined limit the lugs 18 formed integrally with the portions 7ª extend outwardly and obliquely backward into position to engage the portions 9ª should they tend to swing outwardly upon their hinged connections beyond a desirable limit. When the bolts 8, however, are drawn up sufficiently tightly very little if any hinge movement at 16 will take place.

In Fig. 4 I have illustrated a second modification. The rear end of the stem member 5ᵇ is turned into a horizontal position, a twist being formed intermediate the ends of the stem member at 19. The rear end of the member 5ᵇ is provided with the spaced apertures 6 as usual. In this construction the portions 7ᵇ are formed integrally with the portions 9ᵇ but said portions 9ᵇ and 7ᵇ are turned with their broad faces horizontally disposed to correspond with the disposition of the member 5ᵇ. In the ends of the portions 7ᵇ, bolt apertures 20 are arranged while spaced from said apertures are the bolt slots 21 curved upon a radius from the said bolt apertures in the end. The bolts 8 may be arranged, one in the apertures 20 and one in the curved slots 21, said bolts of course extending through the apertures 6 whereupon the portions 9ᵇ may be relatively adjusted into desired position and the nuts on the bolts 8 drawn up to clamp the portions 9ᵇ in fixed adjustment.

It will be readily understood that many other forms and modifications of the device may be employed, retaining, however, the general principles, spirit and intent of the invention. While the preferred form as hereinbefore stated, is illustrated in Figs. 1 and 2, I do not desire to be limited to the construction there shown. It should also be stated that the device may be used with breast harness or other forms of harness as well as with a collar, attachments to such other forms of harness being made in a similar manner as will be readily apparent upon suggestion to those skilled in the art.

I claim—

An undercheck comprising a central bar formed near its rear end with a series of openings, two diverging bars extending along and straddling the rear end of the central bar and adjustable thereon, bolts securing the diverging bars to the central bar, said bolts adapted to pass through the openings in the central bar, a loop at the end of each bar, a snap hook loosely secured to each loop, a loop at the front end of the central bar, a strap provided at its ends with loops, and a flexible connection between the strap and the loop at the front end of the bar.

In testimony that I claim the above, I have hereunto subscribed my name in the presence of two witnesses.

CARL TH. FRIEDRICH.

Witnesses:
E. J. MACK,
ROY SMITH.

---

Copies of this patent may be obtained for five cents each, by addressing the "Commissioner of Patents, Washington, D. C."